United States Patent
Barral et al.

(10) Patent No.: US 7,690,709 B2
(45) Date of Patent: Apr. 6, 2010

(54) REAR DOOR FOR FITTING TO A MOTOR VEHICLE, AND A SET OF TWO REAR DOORS

(75) Inventors: Denis Barral, Montalieu Vercieu (FR); Philippe Coudron, Caluire & Cuire (FR); Gérald Andre, Amberieu en Bugey (FR); Guilherme Amorin, Chazey sur Ain (FR); Jérôme Fillon, Lyons (FR)

(73) Assignee: Compagnie Plastic Omnium, Lyons (FR)

( * ) Notice: Subject to any disclaimer, the term of this patent is extended or adjusted under 35 U.S.C. 154(b) by 191 days.

(21) Appl. No.: 11/905,583

(22) Filed: Oct. 2, 2007

(65) Prior Publication Data

US 2008/0092448 A1    Apr. 24, 2008

(30) Foreign Application Priority Data

Oct. 3, 2006    (FR)  .................................. 06 54069

(51) Int. Cl.
    *B60J 5/10*    (2006.01)

(52) U.S. Cl. .......................... 296/56; 296/146.8; 49/333
(58) Field of Classification Search .................. 296/56, 296/146.4, 146.8, 106; 49/333, 334, 335
    See application file for complete search history.

(56) References Cited

U.S. PATENT DOCUMENTS

| 6,669,268 B2 * | 12/2003 | Oberheide ............... 296/146.8 |
| 2004/0244294 A1 | 12/2004 | Schachtl |
| 2006/0043763 A1 | 3/2006 | Berklich, Jr. et al. |
| 2006/0082186 A1 | 4/2006 | Bals |

FOREIGN PATENT DOCUMENTS

| DE | 102 40 323 A1 | 3/2004 |
| EP | 1 134 104 A1 | 9/2001 |
| WO | WO 03/036008 A1 | 5/2003 |
| WO | WO 03/097978 A1 | 11/2003 |

\* cited by examiner

*Primary Examiner*—Joseph D Pape
(74) *Attorney, Agent, or Firm*—Oliff & Berridge, PLC

(57) ABSTRACT

The invention relates to a rear door for a motor vehicle, the door including hinges (16, 16') embodying an axis (Y) for pivoting the door on the vehicle between a closed position and an open position. The door includes a motor (17) for generating a driving torque about the pivot axis of the door.

9 Claims, 2 Drawing Sheets

REAR DOOR FOR FITTING TO A MOTOR VEHICLE, AND A SET OF TWO REAR DOORS

The present invention relates to a rear door for fitting to a motor vehicle, and to a set of two rear doors.

STATE OF THE ART

Such a rear door, e.g. a tailgate, is already known in the state of the art and includes pivot means embodying an axis for pivoting the door between a closed position and an open position. In order to make the door easier to open, it is common practice to use balancing means in addition to the pivot means, and serving to balance the door, e.g. two telescopic cylinders.

It is also known that it is desirable to be able to control the opening of the door electronically with the help of motor means.

For this purpose, one way of providing a motor to drive opening of the door consists in providing on the vehicle body (or structure), a motor for driving the cylinders.

PROBLEM POSED BY THAT STATE OF THE ART

The difficulty lies in the fact that it is necessary to provide a special body (body-in-white) that is adapted for mounting and securing the motor that drives the cylinders, particularly given that the motor is relatively bulky.

However, it is advantageous for an automobile manufacturer to propose motor-driven opening of the door as an option. When the manufacturer proposes optional motorization of the door, it is then necessary to provide two types of body on the assembly line, i.e. a standard body and a body that is specially adapted to receive the motor.

The invention proposes a rear door that can be opened in motorized manner, while also being suitable for mounting on a body that is simple, which body can equally well receive a motorized door or a door that is opened manually.

TECHNICAL SOLUTION PROPOSED BY THE INVENTION

The present invention provides a rear door for fitting on a motor vehicle, the door including pivot means embodying an axis for pivoting the door on the vehicle between a closed position and an open position, the door being characterized in that it includes motor means for generating a driving torque about the pivot axis of the door.

ADVANTAGES PROVIDED BY THE INVENTION

It should be observed that stating that "the door includes motor means" means that the motor means move together with the door relative to the body when the door goes from the closed position to the open position, and vice versa.

By means of the invention, a rear door is made available that has the motor needed for motor-driven opening integrated directly therein, without it being necessary to provide a specially adapted vehicle body. Thus, the same body can be used regardless of whether it is to receive a motorized door or not, thereby simplifying management of body versions with manufacturers, and thus reducing cost.

In addition, since the body does not include the motor, it provides additional space for other functions at the rear of the body or at the door. In particular, it is possible to provide an opening sunroof in the roof of the body. More space is made available inside the cabin, particularly vertically. This extra space is particularly advantageous in terms of the field of view for the central front rearview mirror. Indeed, it is possible to install the motor means directly in the top portion of the door without that obstructing the field of view, rather than under the roof or in the side portions of the body as has been done in the prior art. Advantageously, the space made available in the top of the body makes it possible to provide a window that is larger.

Another advantage lies in the fact that the motor means do not act directly on the means for balancing the door, so the balancing means can be identical regardless of whether the door is motorized or not. Furthermore, since the motor means act directly on the pivot means of the door, such as hinges, and not via balancing cylinders, the space used by the motor means on the door is particularly small. This simplifies motorizing the door considerably. In particular, there is no need to provide cable guide means or reel systems.

It should also be observed that providing the motor means on the door causes the motor means to be stationary relative to the door while it is opening, so there is no need to provide any safety space between the motor means and the door to allow them to move relative to each other. This achieves a saving in space on the door that can be used for performing other functions, such as reinforcement.

Furthermore, the invention makes available a rear module, referred to as a "tailgate module", that can be fitted onto a vehicle, said module already being fitted with various members that it supports, including the motor means, thereby off-loading the vehicle assembly line. On this prefitted module, the motor means are preferably positioned in their final position for use on the vehicle, or else they are prepositioned so as to be in a position very close to their final position, thereby minimizing the amount of handling required on the main vehicle assembly line for the purposes of positioning or fastening them.

In an advantageous embodiment of this module, it should be observed that the assembly line is involved only with steps of fastening the tailgate and of electrically connecting the motor means to the vehicle, and is not involved with steps of putting the motor means into place on the tailgate, which steps can take time because of the lack of accessibility to the tailgate once it has been fitted to the vehicle.

Finally, it can be observed that the motor means, arranged in this way on the door, are particularly accessible for maintenance and/or repair purposes.

OPTIONAL CHARACTERISTICS

A rear door of the invention may further include one or more of the following characteristics:

The motor means comprise a shaft co-operating with the pivot means on the axis thereof. The motor means can thus drive the shaft in rotation about the pivot axis of the door, said shaft itself driving the pivot means so as to open or close the door.

The pivot means include means for meshing with the shaft, in particular fluting, a key, or interfitting sections, e.g. polygonal sections. By using a hinge, e.g. including a hollow fluted sleeve, that co-operates with the shaft of the motor, a particularly simple manner of driving the hinge is made available.

The door includes an inside skin on which the pivot means and the motor means are fitted. Fastening the pivot means and the motor means thus does not pose any problems of shrink marks or of poor appearance for the outside portion of the door. Furthermore, when the inside skin is of plastics material, it is particularly easy to shape it for receiving and fastening the motor means, and in particular it is easier than it would be if the inside skin were made of sheet metal.

The motor means are housed in the top portion of the door, above a rear window, so as to release the remainder of the door in order to enable other functions to be integrated therein.

The door further includes balancing means enabling the door to be held in the open position, thus making it possible to reduce the force that the motor needs to deliver.

The door includes protection means for protecting the motor means, so as to protect them from large external projections.

The door includes releasable connection means for electrically connecting the motor means to the body of the vehicle. Such means make it simple to connect the motor means to an electric circuit provided in the body, merely by making a plug connection.

The invention also provides a set of two rear doors for a motor vehicle, each door having an identical outside skin and an identical inside skin, the set being characterized in that only the first door is a door as defined above, the second door being designed to be opened manually, i.e. not being motorized.

The invention also provides a method of assembling a vehicle including a rear door as described above, in which the rear door is initially fitted with motor means, and is subsequently fitted to the vehicle.

BRIEF DESCRIPTION OF THE FIGURES

The invention can be better understood on reading the following description given purely by way of example and made with reference to the drawings, in which.

Figure 1:
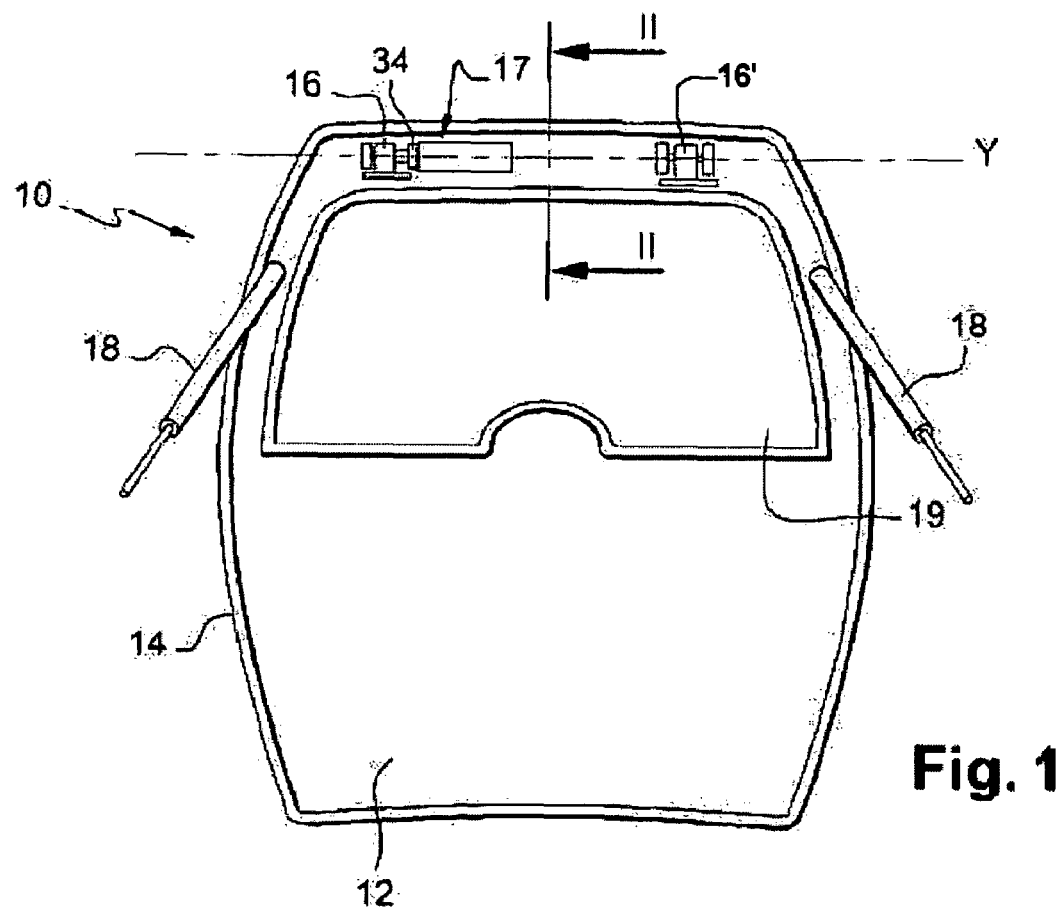
FIG. 1 is a diagrammatic view of the inside of a rear door of the invention.

As can be seen in FIG. 1, a tailgate module, constituting a rear door 10 of the invention, comprises an inside skin 12 of plastics material (thermosetting or thermoplastic), an outside skin 14 of plastics material (thermosetting or thermoplastic), pivot means 16, 16', motor means or motor 17 for driving the means 16, balancing means 18, comprising two telescopic cylinders for balancing opening of the door, and a rear window 19. The hinges 16, 16', the motor 17, and the cylinders 18 are fitted to the inside skin 12.

The pivot means 16, 16' embody a pivot axis Y for pivoting the door relative to the vehicle, between a closed position and an open position. They comprise two hinges 16 and 16'. The hinge 16 is coupled with the motor means 17 so as to generate a driving torque about the pivot axis Y, as described below.

Figure 2:
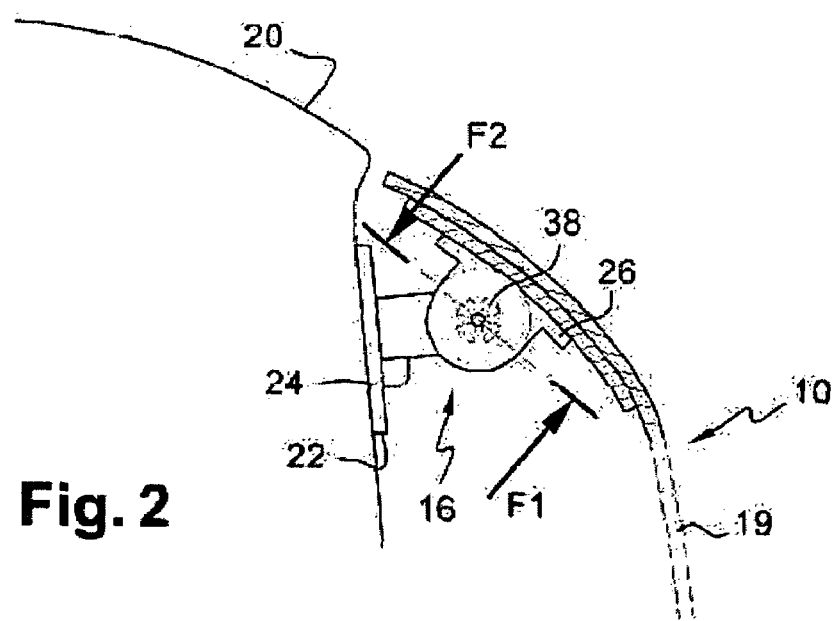
FIG. 2 is a diagrammatic section view of the rear door of FIG. 1, mounted on a vehicle body, with the motor means not being shown.
Figure 3:
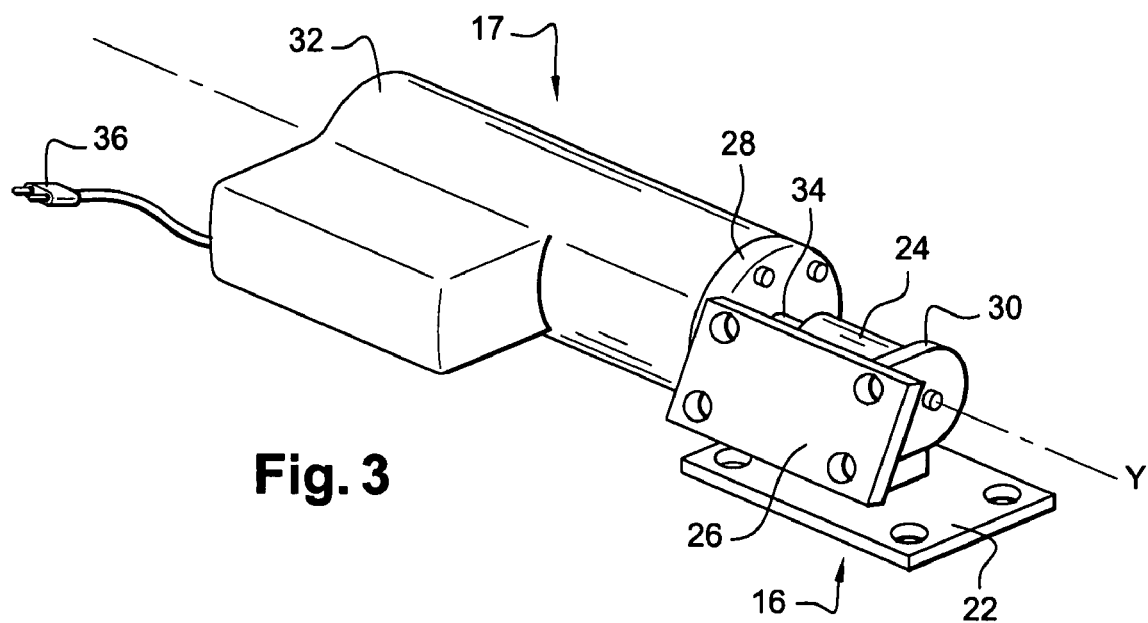
FIG. 3 is a perspective view of the motor means of the FIG. 1 door.

As can be seen in FIG. 3, the hinge 16 comprises a plate 22 for securing to the vehicle body, a hollow sleeve 24, including gear means, constituted by fluting 38 as visible in FIG. 2, and projecting from the plate 22.

The hinge 16 also has a plate 26 for securing to the inside skin 12 of the door 10, and two washers 28, 30 projecting from the plate 26, and each having a central orifice.

The motor means 17 are mounted on the top portion of the door, above the rear window 19. They comprise a central body 32, a shaft 34, and releasable means 36 for electrically connecting the motor 17 to the vehicle body 20. The central body 32 is contained in a housing, serving as protection means, that provides protection for the motor means.

The hinge 16 and the motor 17 co-operate as follows. The shaft 34 is mounted inside the hinge, going through the orifice of the washer 28, the sleeve 24, and the orifice of the washer 30, so as to co-operate with the hinge 16 on the axis Y. To facilitate co-operation, the fluting 38 of the sleeve 24 co-operates with complementary fluting formed on the shaft 34 of the motor.

The operation of the rear door is described below. When the motor 17 is activated, the shaft 34 is driven in rotation so as to generate a driving torque, represented by forces F1 and F2 in FIG. 2 about the axis Y. Because of the fluting 38 formed in the sleeve 24, rotation of the shaft 34 leads to rotation of the sleeve 24, and consequently to pivoting of the opening 10. During this pivoting, opening is facilitated by the cylinders 18.

According to an advantageous aspect of the invention, a set of two rear doors is available, the first being identical to the rear door 10, and the second not including any motor means, i.e. having two hinges similar to the hinge 16'. Thus, the invention makes it easy to mount motor means optionally on the door 10, since it suffices to take a door not provided with the option and mount thereon the hinge 16 that is associated with the motor 17, without it being necessary to modify the remainder of the door.

Finally, it should be observed that the invention is not limited to the above-described embodiment.

Amongst the advantages of the invention, it should be observed that using inside and outside skins of plastics material makes it possible to lighten the door, such that the above-described motor means require less energy.

It should also be observed that the door 10 can be fitted on a vehicle in the form of a pre-fitted module, with the motor means 17 being fitted to the door beforehand. Thus, the means 17 are mounted on the door away from the vehicle assembly line (possibly in another factory), which is easier to do than once the door has already been fitted on the vehicle, and is therefore difficult to access, in particular about its pivot axis.

The invention claimed is:

1. A rear door for fitting on a motor vehicle, the door comprising:
   pivot means embodying an axis (Y) for pivoting the door on the vehicle between a closed position and an open position;
   a window defined by the door; and
   motor means for generating a driving torque about the pivot axis of the door, the motor means being mounted on a top portion of the door, above the window.

2. A rear door according to claim 1, in which the motor means comprise a shaft co-operating with the pivot means on the axis thereof.

3. A rear door according to claim 2, in which the pivot means include means for meshing with the shaft.

4. A rear door according to claim 1, including an inside skin on which the pivot means and the motor means are fitted.

5. A rear door according to claim 1, further including balancing means enabling the door to be held in the open position.

6. A rear door according to claim 1, including protection means for protecting the motor means.

7. A rear door according to claim 1, including releasable connection means for electrically connecting the motor means to the body of the vehicle.

8. A set of two rear doors for a motor vehicle, each door having an identical outside skin and an identical inside skin, wherein only the first door is a door according to claim 1.

9. A method of assembling a vehicle including a rear door according to claim 1, in which the rear door is initially fitted with motor means, and is subsequently fitted to the vehicle.

* * * * *